United States Patent
Schultz et al.

(10) Patent No.: US 11,939,513 B2
(45) Date of Patent: Mar. 26, 2024

(54) SURFACTANT IMPREGNATED LOST CIRCULATION, SCRUBBING, AND SCOURING MATERIAL

(71) Applicant: SELECT CHEMISTRY, LLC, Houston, TX (US)

(72) Inventors: Garrett Schultz, Spring, TX (US); Jordan Clark, Tomball, TX (US)

(73) Assignee: SELECT CHEMISTRY, LLC, Houston, TX (US)

( * ) Notice: Subject to any disclaimer, the term of this patent is extended or adjusted under 35 U.S.C. 154(b) by 0 days.

(21) Appl. No.: 17/961,289

(22) Filed: Oct. 6, 2022

(65) Prior Publication Data

US 2023/0145502 A1 May 11, 2023

Related U.S. Application Data (60) Provisional application No. 63/272,772, filed on Oct. 28, 2021.

(51) Int. Cl.

| | |
|---|---|
| *C09K 8/524* | (2006.01) |
| *C09K 8/42* | (2006.01) |
| *C09K 23/00* | (2022.01) |
| *E21B 21/00* | (2006.01) |
| *E21B 37/00* | (2006.01) |

(52) U.S. Cl.
CPC ............ *C09K 23/017* (2022.01); *C09K 8/424* (2013.01); *C09K 8/524* (2013.01); *E21B 21/003* (2013.01); *E21B 37/00* (2013.01)

(58) Field of Classification Search
None
See application file for complete search history.

(56) References Cited

U.S. PATENT DOCUMENTS

| | | | |
|---|---|---|---|
| 6,016,872 A * | 1/2000 | Davis | C09K 8/32 166/312 |
| 6,471,983 B1 | 10/2002 | Veeger et al. | |
| 2008/0076314 A1* | 3/2008 | Blanz | A47L 13/17 442/327 |
| 2008/0139412 A1* | 6/2008 | Fuller | C09K 8/72 507/219 |
| 2010/0298175 A1* | 11/2010 | Ghassemzadeh | C09K 8/516 507/124 |
| 2011/0277261 A1 | 11/2011 | Hasket et al. | |
| 2015/0275600 A1* | 10/2015 | Wang | E21B 37/00 166/267 |
| 2016/0184203 A1 | 6/2016 | Garcia et al. | |
| 2018/0104177 A1 | 4/2018 | Constantine et al. | |
| 2020/0055777 A1 | 2/2020 | Cappellari et al. | |
| 2020/0140740 A1 | 5/2020 | Leotaud et al. | |

OTHER PUBLICATIONS

International Search Report and Written Opinion issued in PCT application No. PCT/US2022/045910, dated Mar. 1, 2023 (9 pages).

* cited by examiner

*Primary Examiner* — Andrew Sue-Ako
(74) *Attorney, Agent, or Firm* — EWING & JONES, PLLC (57) ABSTRACT

A solid surfactant composition includes a water-wetting surfactant and a plant fiber carrying agent. A process includes forming a solid surfactant composition comprising a water-wetting surfactant and a plant fiber carrying agent and injecting the solid surfactant composition into a wellbore.

2 Claims, 8 Drawing Sheets

MOUNT EVEREST OBM     OBM - WATER     OBM - WATER - SPACER     OBM - WATER - SPACER - WATER ROTOR WETTABILITY TEST WITH 12.14ppb M40G T30 AT 175°F

ROTOR WETTABILITY TEST WITH 15ppb TBW25 AT 175°F

FIG. 6
ROTOR WETTABILITY TEST WITH 12.13ppb 35/100 COCOSORB T30 AT 175°F

SURFACTANT IMPREGNATED LOST CIRCULATION, SCRUBBING, AND SCOURING MATERIAL

CROSS-REFERENCE TO RELATED APPLICATIONS

This application is a nonprovisional application which claims priority from U.S. provisional application No. 63/272,772, filed Oct. 28, 2021, which is incorporated by reference herein in its entirety.

FIELD

The disclosure relates generally to the use of lost circulation materials for well cleaning.

BACKGROUND ART

During drilling operations, loss of circulation, such as total or partial loss of drilling fluids or cement to high-permeability zones, cavernous formations and natural or induced fractures during drilling, may result in loss of drilling fluid and delay in the drilling of a well. In certain traditional drilling operations, lost circulation controllers added to the drilling fluid may form low-permeability bridges across openings in the formation that retard or prevent loss of circulation during drilling.

In a well cementing operation, casing and liners may be cemented in wellbores. For example, cement may be pumped into an annulus between the exterior surface of casing or liner and the walls of the wellbore or interior walls of casing. The cement may then harden in the annulus. The cement may act to prevent migration of fluids in the annulus. Preparation for the cementing operation is traditionally performed by pumping a fluid into the wellbore to clean solids and liquid, such as water and hydrocarbons. In certain traditional cementing operations, the fluid may include a liquid surfactant to allow the fluid to be compatible with water- or oil-based drilling fluids. Inclusion of the liquid surfactant may allow cleaning of the wellbore by removal of any residual drilling fluid. Liquid surfactants may also water-wet surfaces in the wellbore, such as the wellbore wall and casing surfaces. Water wetting surfaces may allow for better cement bonding.

SUMMARY

In an embodiment, a solid surfactant composition is disclosed. The solid surfactant composition includes a water-wetting surfactant and a plant fiber carrying agent.

In another embodiment, a process is disclosed. The process includes forming a solid surfactant composition comprising a water-wetting surfactant and a plant fiber carrying agent and injecting the solid surfactant composition into a wellbore.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily reduced for clarity of discussion.

DETAILED DESCRIPTION

The following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

This disclosure is not limited to the embodiments, versions, or examples described, which are included to enable a person having ordinary skill in the art to make and use the disclosed subject matter when the information contained herein is combined with existing information and technology.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations. For example, if the detailed description recites a range of from 1 to 5, that range includes all iterative ranges within that range including, for instance, 1.3-2.7 or 4.9-4.95.

Certain embodiments of the present disclosure are to a solid surfactant composition including a water-wetting surfactant and a plant fiber carrying agent. The solid surfactant composition may be used with drilling fluids for control of lost circulation, or as a scrubbing or scouring material for such operations as preparation for a cementing operation or otherwise cleaning a wellbore. In certain embodiments, the solid surfactant composition may be used as a spacer fluid. Without being bound by theory, when used as a scrubbing or scouring agent, the solid surfactant composition may act chemically and mechanically to clean the wellbore.

In certain embodiments, the water-wetting surfactant may be an alcohol ethoxylate, an alcohol ethoxysulfate, an alkyl phenol ethoxylate, an olefin sulfonate, an alkyl betaine, a glycol ether, derivatives thereof, and combinations thereof. In some embodiments, the water-wetting surfactant may be non-hazardous, meeting US EPA Safer Product Standards.

In some embodiments, the plant fiber carrying agent may be of sustainable origin, such as corn cob hulls or fiber, walnut shells, peanut shells, coconut coir or shells, kenaf fiber and combinations thereof. The solid surfactant composition may include the water-wetting surfactant in an amount of 0.5-40% by weight of plant fiber carrying agent.

EXAMPLES

Example 1—Sample Preparation

Several plant fiber carrying agents were chosen for review. These included Black Walnut Shell Fine LCM commercially available from Hammons with a 20/100 mesh size, English Walnut Shell, commercially available from Eco Shell with 35/60 and 70/200 mesh sizes respectively, Grit-O'Cobs, derived from the woody portion of corn cob, commercially available from Andersons Cob Products with a minus 80 and minus 40 granular mesh sizes respectively, and Coconut Coir, commercially available from Coco Absorb. The Coco Absorb was future sieved down to a 35/100 mesh size sample.

Figure 1:
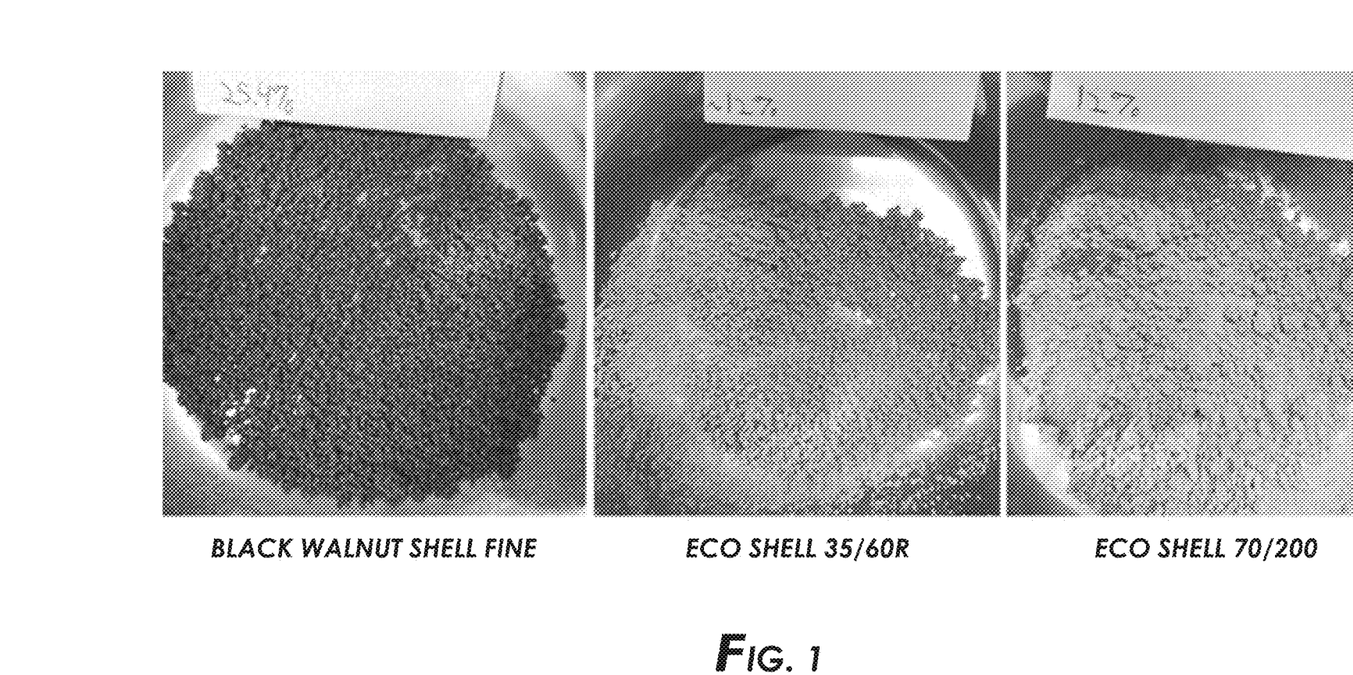
FIG. 1 is a pictorial representation of free flowing surfactant impregnated with a plant fiber carrier in accordance with Example 1.
Figure 2:
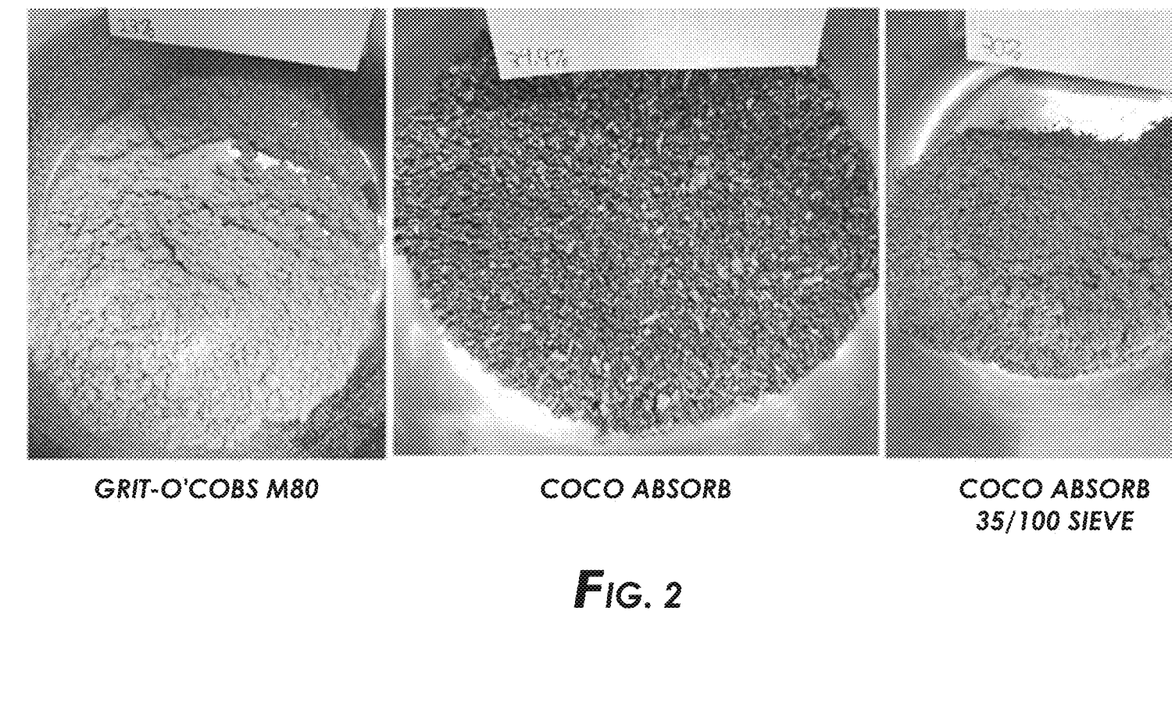
FIG. 2 is a pictorial representation of free flowing surfactant impregnated with a plant fiber carrier in accordance with Example 1.

Each of the plant fiber carrying agents are spray dried with Tomadol 900, a [blend of C9-C11 ethoxylated alcohol and glycol ether], to determine maximum active concentrations, shown in Table 1, before the composite became visually clumped and remained in a flowable state, shown in FIG. 1 and FIG. 2. Each solid composite was further labeled based on the carrier material and active surfactant concentration. For example, the Black Walnut Shell Fine LCM with a Tomadol 900 surfactant loading of 25.4% was labeled BW T25. Further example, the Grit-O'Cobs M80 with a Tomadol surfactant loading of 23% was labeled M80 T23.

TABLE 1

Maximum Surfactant Concentrations for Free Flowing Plant Fiber Carrier

| Plant Fiber LCM Product | Max Surfactant A Conc. by Weight | Flowable (Yes/No) |
| --- | --- | --- |
| Black Walnut Shell Fine LCM | 25.4% | Yes |
| Eco Shell 35/60R | 12% | Yes |
| Eco Shell 70/200 | 12% | Yes |
| Grit-O'Cobs M80 | 23% | Yes |
| Grit-O'Cobs M40G | 30% | Yes |
| Coco Absorb | 34.9% | Yes |
| Coco Absorb (35/100 Sieve) | 30% | Yes |

Example 2

Figure 3:
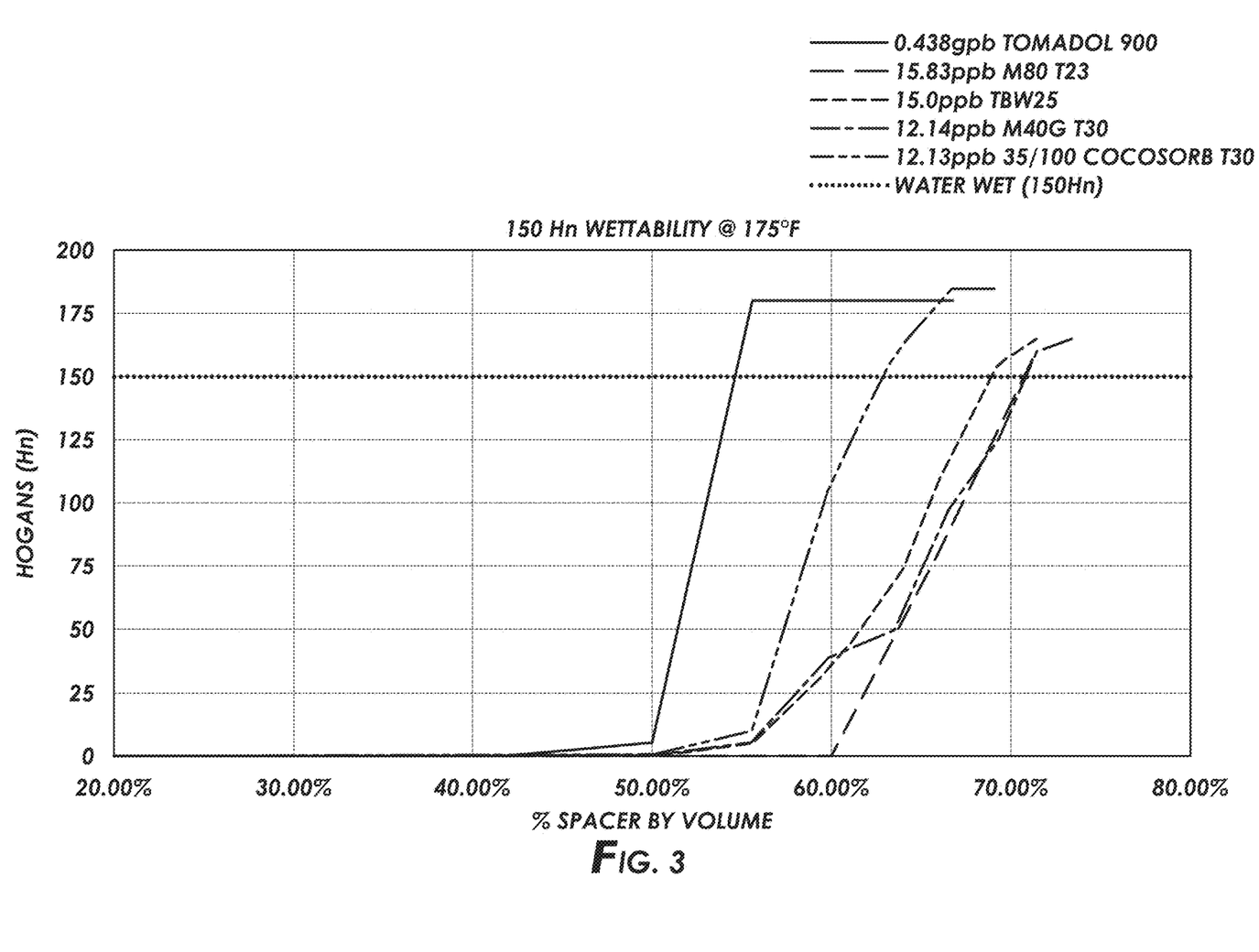
FIG. 3 is a graph of the results of a wettability test in accordance with Example 2.

Field originated oil-based mud (OBM), labeled Mount Everest OBM, was obtained for laboratory testing. Spacer formulations, shown in Table 2, were designed using the standalone liquid surfactant, Tomadol 900, as well as the prepared surfactant impregnated lost circulation material samples. The standalone liquid surfactant loading of 0.438 gal per barrel (gpb) was determined to be the minimum concentration of Tomadol 900 to pass the Fann wettability spacer surfactant screening test (SSST), as shown in FIG. 3. The loading for each solid composite was adjusted, based on surfactant activity level, to match a total surfactant loading of 0.438 gpb.

TABLE 2

Spacer Formulations with Surfactant Impregnated Lost Circulation Material

| | Formula | | | | |
| --- | --- | --- | --- | --- | --- |
| | I | II | III | IV | V |
| Barite (lb/bbl) | 244.9 | 241.3 | 240.5 | 239.3 | 240.9 |
| Diutan Gum (lb/bbl) | 0.5 | 0.5 | 0.5 | 0.5 | 0.5 |
| Tomadol 900 (gal/bbl) | 0.438 | | | | |
| BW T25 (lb/bbl) | | 15.0 | | | |
| 35/100 Cocosorb T30 (lb/bbl) | | | 12.13 | | |
| M80 T23 (lb/bbl) | | | | 15.83 | |
| M40G T30 (lb/bbl) | | | | | 12.14 |
| Density (lb/gal) | 12.8 | 12.8 | 12.8 | 12.8 | 12.8 |

Wettability, or SSST, tests were performed using a Fann Wettability Tester at 175° F. and calibrated with the formulation spacer systems to 150 Hogans (Hn) prior to each test. Tests were run using the field originated OBM. Results for each spacer formulation wettability test are shown in FIG. 3. As standardized in API RP 10B-2 Section 13.7 on Spacer Surfactant Screening Tests, a passing result is achieved if full conductivity, 150 Hn, is reached prior to the spacer equal to 75% of the OBM/spacer mixture added.

All surfactant impregnated lost circulation material composites effectively released the surfactant into the mixture and were able to flip the OBM to water wet. The results shown in FIG. 3 illustrate an effective chemical wash method.

Example 3

A rotor wettability and wash test was performed on all spacer formulations using an OFITE Model 900 rheometer with all fluids conditioned to 175° F. Test procedure followed a 5, 5, 10, 5 test method; OBM for 5 minutes, water for 5 mins, spacer for 10 mins, followed by water for 5 mins. A final stage test rotor showing no beading will indicate water-wet results by the spacer.

Figure 4:
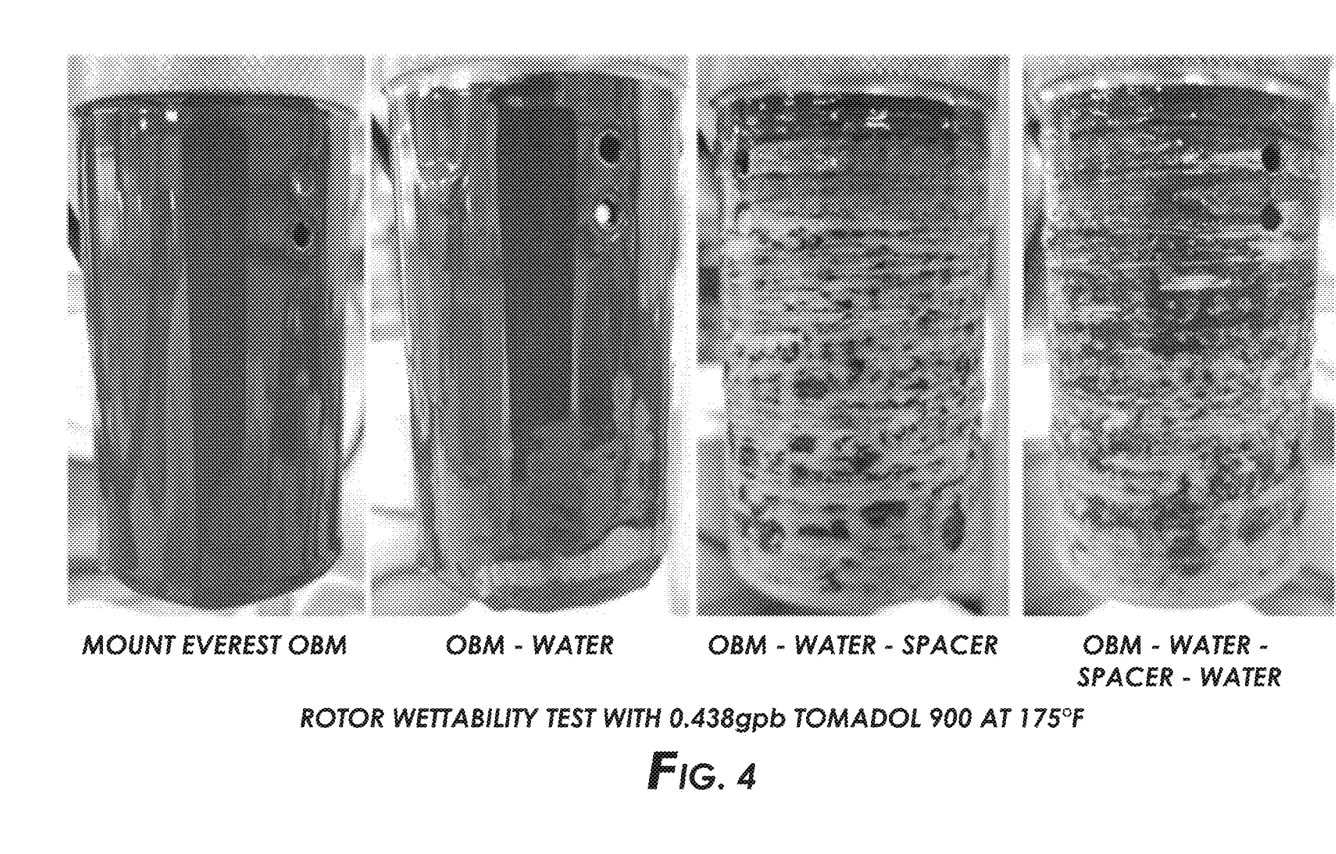
FIG. 4 is a rotor wettability test in accordance with Example 3.
Figure 5:
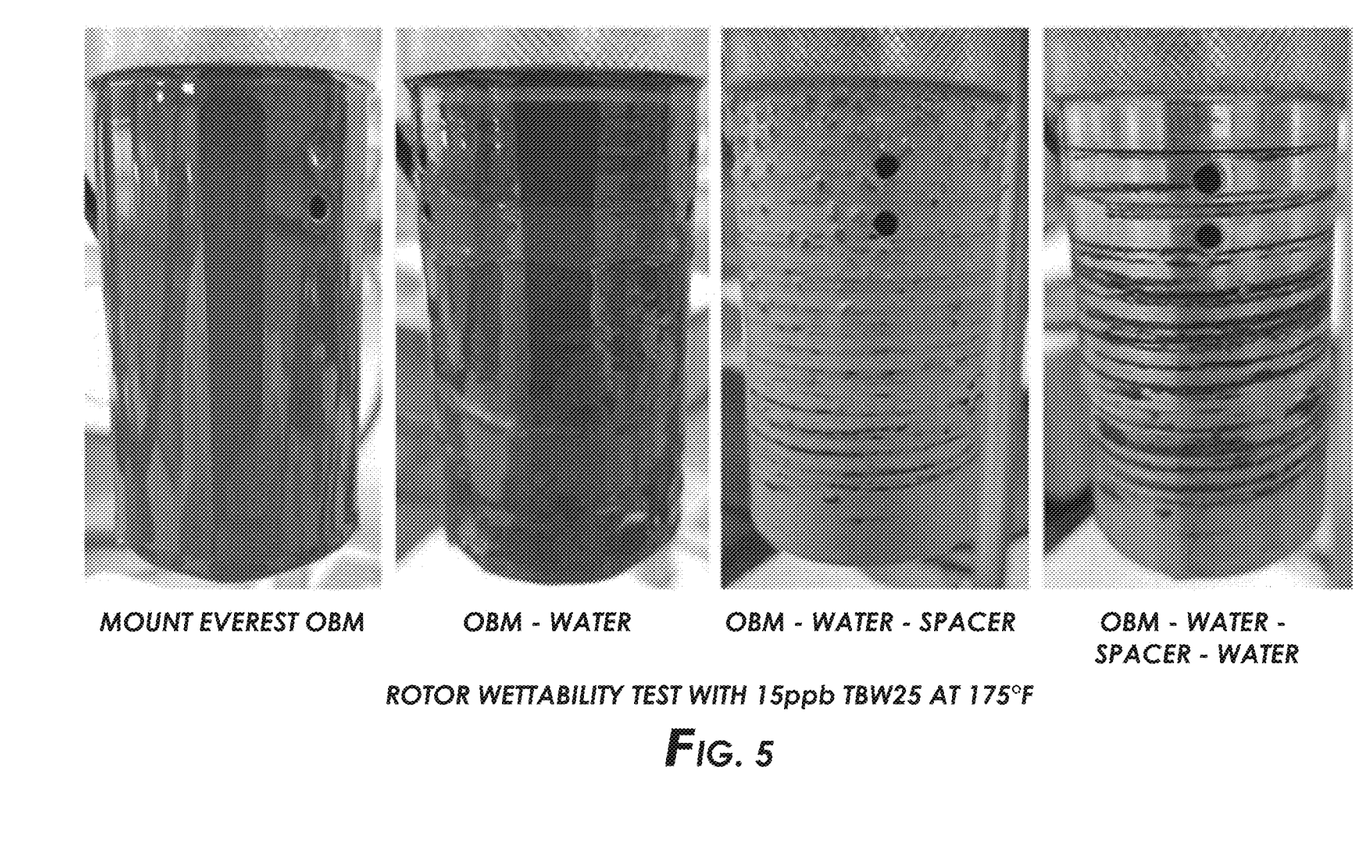
FIG. 5 is a rotor wettability test in accordance with Example 3.
Figure 6:
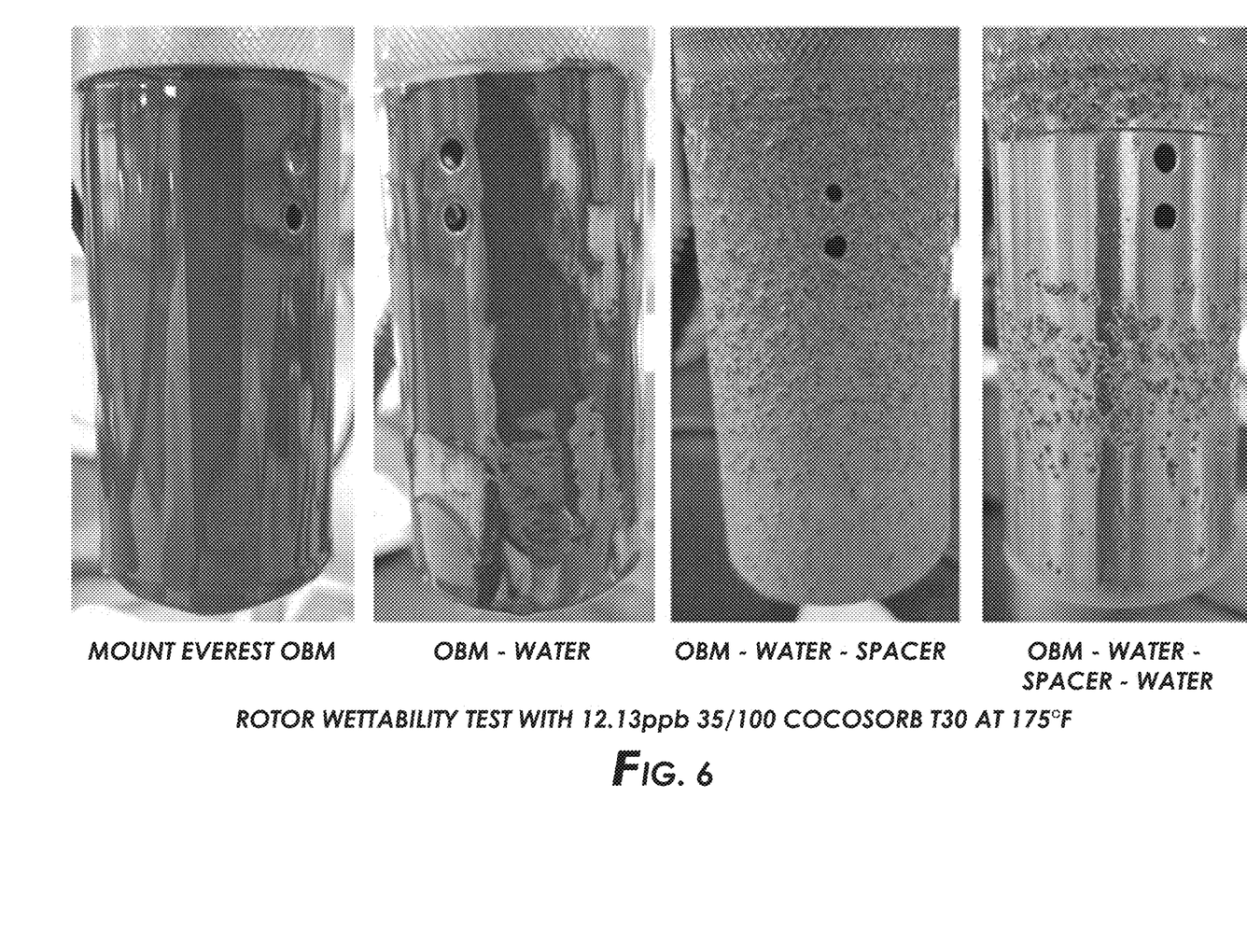
FIG. 6 is a rotor wettability test in accordance with Example 3.
Figure 7:
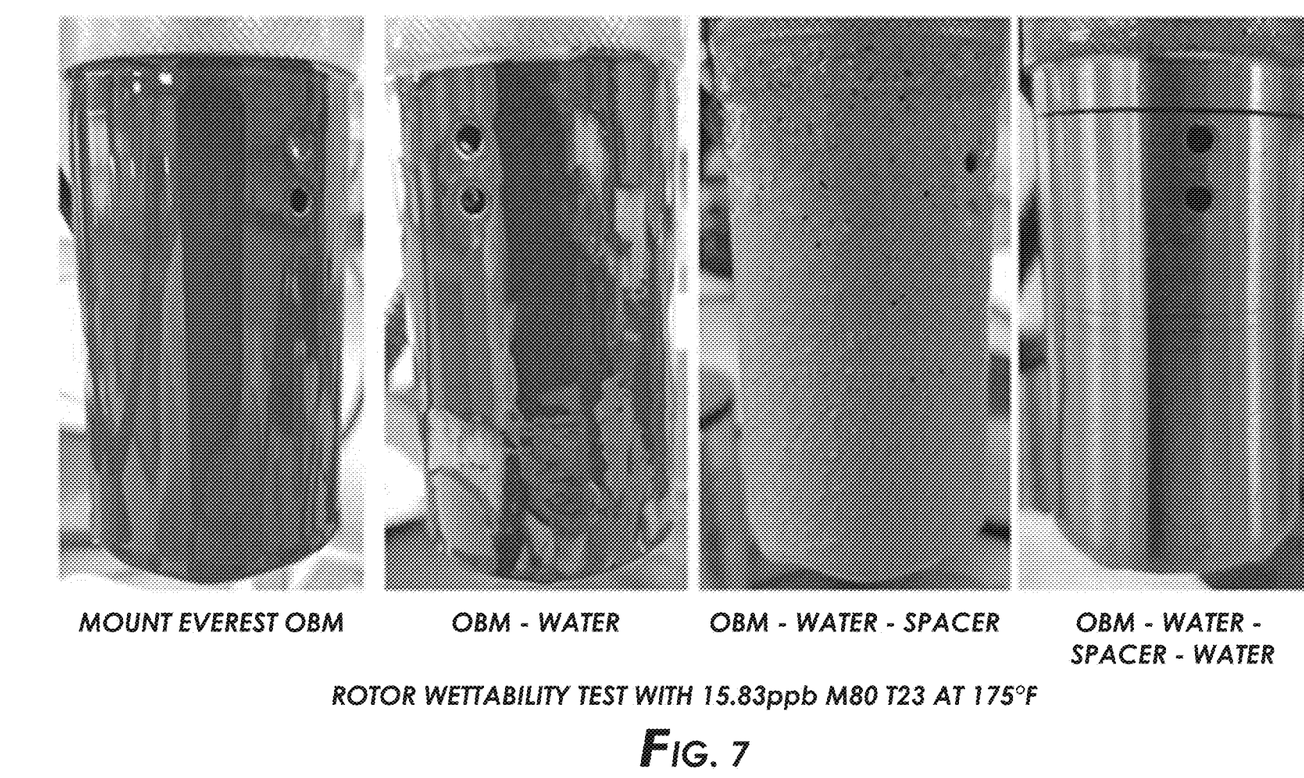
FIG. 7 is a rotor wettability test in accordance with Example 3.
Figure 8:
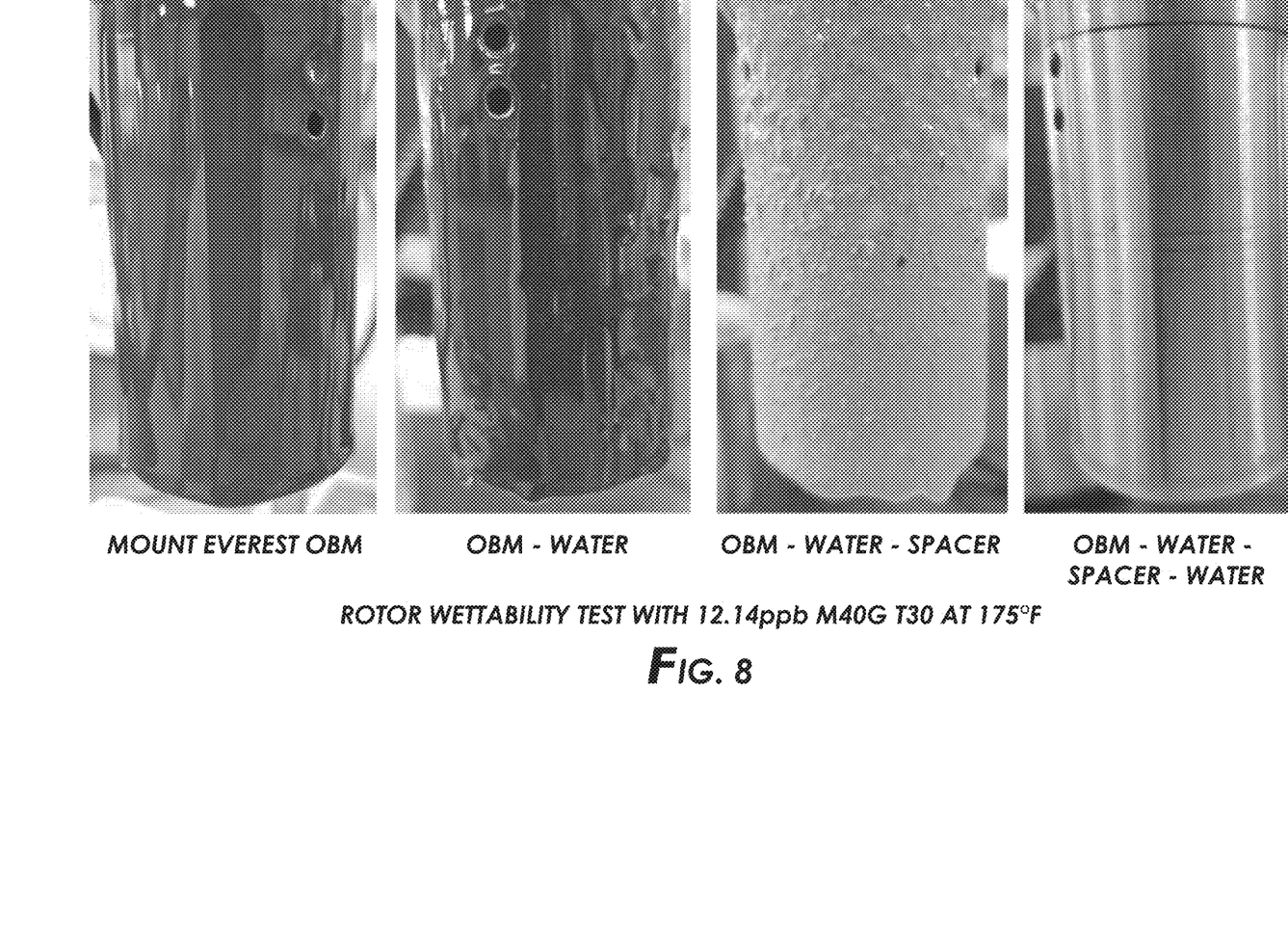
FIG. 8 is a rotor wettability test in accordance with Example 3.

Rotor wettability results for spacer formulation I from Table 2 are shown in FIG. 4. Though the liquid surfactant was effective at water-wetting the OBM in the Fann wettability test, it failed to properly water-wet and wash during the rotor wettability test.

Improved results are shown in FIG. 5 through FIG. 8 for all surfactant impregnated lost circulation material spacer formulations. Notably both the M80 and M40G corn cob carrier products yielded the best rotor wettability and wash results.

Example 4

Well Integrity benefits of the surfactant formulations were tested on an OFITE HTHP (high temperature high pressure) Filter Press according to API RP 10B-2 test methods. Table 3 shows the surfactant impregnated lost circulation material improves fluid loss properties of the spacer formulation.

TABLE 3

HTHP Fluid Loss Results at 175°F

| | Formula | |
| --- | --- | --- |
| | I | IV |
| Barite (lb/bbl) | 244.9 | 239.3 |
| Diutan Gum (lb/bbl) | 0.5 | 0.5 |
| Tomadol 900 (gal/bbl) | 0.438 | |
| M80 T23 (lb/bbl) | | 15.83 |
| Fluid Loss (cc/30 mins) | 237 | 166 |

The invention claimed is:
1. A process comprising:
    forming a solid surfactant composition comprising a water-wetting surfactant comprising ethoxylated alco- hol and glycol ether impregnated onto a corn cob fiber carrying agent to provide the solid surfactant composition in a solid flowable state; and injecting the solid surfactant composition into a wellbore.

2. The process of claim 1, wherein the water-wetting surfactant is in an amount of 0.5-40% by weight of the corn cob fiber carrying agent.

\* \* \* \* \*